Reissued Sept. 1, 1942 Re. 22,170

UNITED STATES PATENT OFFICE 22,170

PROCESS OF PREPARING DRIED MILK

Ninni Maria Kronberg, Rydsgard, Sweden, assignor to Svenska Mjolkprodukter Aktiebolag, Stockholm, Sweden, a corporation of Sweden No Drawing. Original No. 2,213,283, dated September 3, 1940, Serial No. 224,539, August 12, 1938. Application for reissue August 27, 1941, Serial No. 408,551. In Sweden January 9, 1933

3 Claims. (Cl. 99—59)

This invention relates to a process for preparing dried milk and to the resulting product.

The invention has for its object generally to provide an improved procedure for effecting the drying of milk in a manner which avoids substantially completely any liabiity to infection by undesirable bacteria, whereby a product having natural properties and of uniformly high quality is obtained.

Specifically, an object is to simplify my former procedure by the preparation of but a single milk portion, together with a suitable suspension for the lactic acid culture, with which the milk portion is to be inoculated.

Other objects of the invention will in part be obvious and will in part appear hereinafter.

The invention accordingly comprises the several steps, and the relation of one or more of such steps with respect to each of the others, and the product possessing the features, properties, and the relation of constituents, which are exemplified in the following detailed disclosure, and the scope of the invention will be indicated in the claims.

This application is a continuation-in-part of my application, Serial No. 703,671, filed December 22, 1933, which has become Patent No. 2,127,-524, dated August 23, 1938.

It has heretofore been proposed to prepare dry milk in powder form which has natural property and, when dissolved in water, yields a fluid resembling natural milk, and possesses living bacterial flora which have been implanted by the process of manufacture. In such prior process, two milk portions were prepared, to one of which a culture of desired bacteria was added. Thereafter, the two portions were evaporated together to a powder in such a manner that the vital powder of the bacteria was retained.

By the process of the present invention, the introduction of the desired bacterial culture is accomplished without the aid of a second milk portion. To this end, a non-milky liquid is employed and the properly cutivated bacteria suspended therein. Such liquid may contain dissolved simple or complex sugars so that, when the milk material is afterwards evaporated to powder in a manner known to be such that, for a given temperature and other conditions, the bacteria will retain their vital power. Any suitable bacterial culture may be introduced in this manner, for example, a pure culture of *B. casei* and *streptococcus lacticus*. The addition is performed preferably at a point in the evaporation process at which the remaining treatment of the more or less thickened milk may be carried out without danger of undesired effects at a temperature such that the introduced bacteria retain their vital power in the final dry milk product.

The steps of the process, according to an exemplary form of the invention, comprise first suspending a culture of lactic acid bacteria, or the like, in an aqueous solution consisting of water and cane sugar, the latter being introduced as a concentrated solution either in water or whey. This suspension is then left for such a period and kept at such a temperature as to achieve a desired condition of the suspension in which the sugar is wholly or substantially inverted to simple sugars, such as levulose or dextrose. This sugar and lactic acid bacteria containing substrate is then added to and thoroughly mixed with the portion of milk material to be employed for the making of the product. This material may be either fresh or pasteurized whole milk, skimmed milk, or cream.

After this addition and mixing, a step of short and vigorous homogenization is practiced. This homogenized batch is thereupon preferably filtered and then passed on to the evaporators where evaporation is completed, as above indicated, until a dry powder is obtained.

The step of evaporation may be carried out in an ordinary drying chamber with or without the use of a vacuum such as described in my Swedish Letters Patent No. 85,916. It is advantageous, however, to practice the step of evaporation in conjunction with the use of an electrifying spraying nozzle in which the walls of the chamber and those of the nozzle are connected to the opposite poles of a suitable source of E. M. F., such as the battery described in my aforesaid Swedish Letters Patent. By means of such a nozzle, the division of the material being evaporated is made more effective and the fineness and uniformity of the milk powder produced increased.

The product of the present invention is characterized by relatively uniform flocculent particles of milk, of light color and fresh-milk odor, and are capable of readily dissolving in water and possess large numbers of latent lactic acid bacteria capable of being revived when the powder is dissolved for reconstructing the milk.

A typical sample of the milk powder has the following composition:

| | Per cent |
|---|---|
| Ash | 6.1 |
| Fat | 0.9 |
| Casein | 23.3 |
| Direct reducing sugar | 44.0 |
| After inversion computed as milk sugar | 16.0 |
| Water | 5.7 |

No starch was present.

The sugar content of the product by the present invention may be given substantially any desired value and may be of a relatively high value.

A typical product of the present invention when tested bacteriologically was found to reveal, under the microscope, the presence of masses of big, vigorous gram-positive rods of the Lactobacille type. Solitary short chains of Lactococci or *Streptococcus cremoris* type and some yeast cells were observed. The acidity of the dissolved milk was such that it coagulated at 37° C. and was 176 degrees Thörner. New transplantations at 37° C. also had the power of coagulating within 24 hours and with the original acidity strength. This is evidence that the flora of the bacteria in the sample of the product tested contains to a predominating degree Lactobacilli of normal appearance and acid generating strength.

Since certain changes in carrying out the above process, and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. A process for producing a powdered milk product which comprises preparing an aqueous non-milky medium, suspending and propagating therein a culture of lactic acid bacteria in a manner retaining the vital power, preparing a separate milk portion to which said suspension is added, thereupon subjecting the resulting mixture to homogenization, and thereafter drying the homogenized mixture to powder without impairing the implanted lactic acid bacteria.

2. A process for producing a powdered milk product which comprises preparing an aqueous non-milky medium, suspending and propagating therein a culture of lactic acid bacteria in a manner retaining the vital power, to which a desired amount of sugar material has been added, preparing a separate milk portion to which said suspension is added, filtering the resulting mixture and subjecting the same to a relatively short and vigorous homogenization, and thereafter drying the homogenized mixture to powder without impairing the implanted lactic acid bacteria.

3. A process for producing a powdered milk product which comprises preparing an aqueous non-milky medium, suspending and propagating therein a culture of lactic acid bacteria in a manner retaining the vital power, to which a desired amount of cane sugar and whey has been added, preparing a separate milk portion, adding said suspension thereto to provide a mixture which is then filtered, thereafter subjecting the mixture to a relatively short and vigorous homogenization, and then drying the same in a chamber into which the milk mixture is sprayed as fine particles under the influence of an impressed electric field.

NINNI MARIA KRONBERG.